US011480154B2

(12) United States Patent
Yang

(10) Patent No.: US 11,480,154 B2
(45) Date of Patent: Oct. 25, 2022

(54) VEHICLE ROOF-MOUNTED WIND GENERATOR ASSEMBLY HAVING A CURVED FRONT HOUSING PORTION AND A HORIZONTAL-AXIS WIND TURBINE

(71) Applicant: Sinou Yang, Conover, NC (US)

(72) Inventor: Sinou Yang, Conover, NC (US)

( * ) Notice: Subject to any disclaimer, the term of this patent is extended or adjusted under 35 U.S.C. 154(b) by 455 days.

(21) Appl. No.: 16/527,265

(22) Filed: Jul. 31, 2019

(65) Prior Publication Data

US 2021/0033070 A1 Feb. 4, 2021

(51) Int. Cl.
*F03D 9/32* (2016.01)
*B60L 8/00* (2006.01)

(52) U.S. Cl.
CPC ............... *F03D 9/32* (2016.05); *B60L 8/006* (2013.01)

(58) Field of Classification Search
None
See application file for complete search history.

(56) References Cited

U.S. PATENT DOCUMENTS

| 4,019,828 | A | * | 4/1977 | Bunzer | .................. | F03D 13/10 |
| | | | | | | 416/55 |
| 4,179,007 | A | * | 12/1979 | Howe | ....................... | F03D 9/25 |
| | | | | | | 180/2.2 |
| D374,656 | S | | 10/1996 | Richardson | | |
| 8,067,846 | B2 | | 11/2011 | Kiler | | |
| 8,169,182 | B1 | | 5/2012 | Kimble | | |
| 8,371,401 | B1 | | 2/2013 | Illustrato | | |
| 9,428,061 | B1 | | 8/2016 | Ripley | | |
| 9,446,670 | B1 | | 9/2016 | McCorkindale | | |
| 10,138,753 | B2 | * | 11/2018 | Munerato | ................. | F03D 9/25 |
| 2004/0084908 | A1 | | 5/2004 | Vu | | |
| 2011/0031043 | A1 | * | 2/2011 | Armani | ..................... | F03D 9/00 |
| | | | | | | 180/2.2 |
| 2011/0248666 | A1 | | 10/2011 | Lorenson | | |
| 2011/0260470 | A1 | * | 10/2011 | Ahmadi | .................. | B60L 58/30 |
| | | | | | | 290/1 R |
| 2013/0127393 | A1 | * | 5/2013 | Garcia | .................. | H02J 7/1415 |
| | | | | | | 320/101 |
| 2016/0153308 | A1 | * | 6/2016 | Munerato | ................. | F03D 1/04 |
| | | | | | | 290/50 |

* cited by examiner

*Primary Examiner* — Tulsidas C Patel
*Assistant Examiner* — S. Mikailoff

(57) ABSTRACT

A wind generator assembly for harnessing wind to charge batteries in electric vehicles and hybrid vehicles includes a housing that is mounted on a roof of a vehicle. The housing has a wind passage extending therethrough and wind passes through the wind passage when the vehicle is driven. A turbine is rotatably positioned in the housing. The turbine is positioned in the wind passage and the turbine is rotated by wind passing through the wind passage. A generator is mounted in the generator space and the generator is in mechanical communication with the turbine. Thus, the turbine rotates the generator when the turbine rotates thereby facilitating the generator to produce electrical current. The generator is electrically coupled to batteries in the vehicle to charge the batteries.

6 Claims, 8 Drawing Sheets

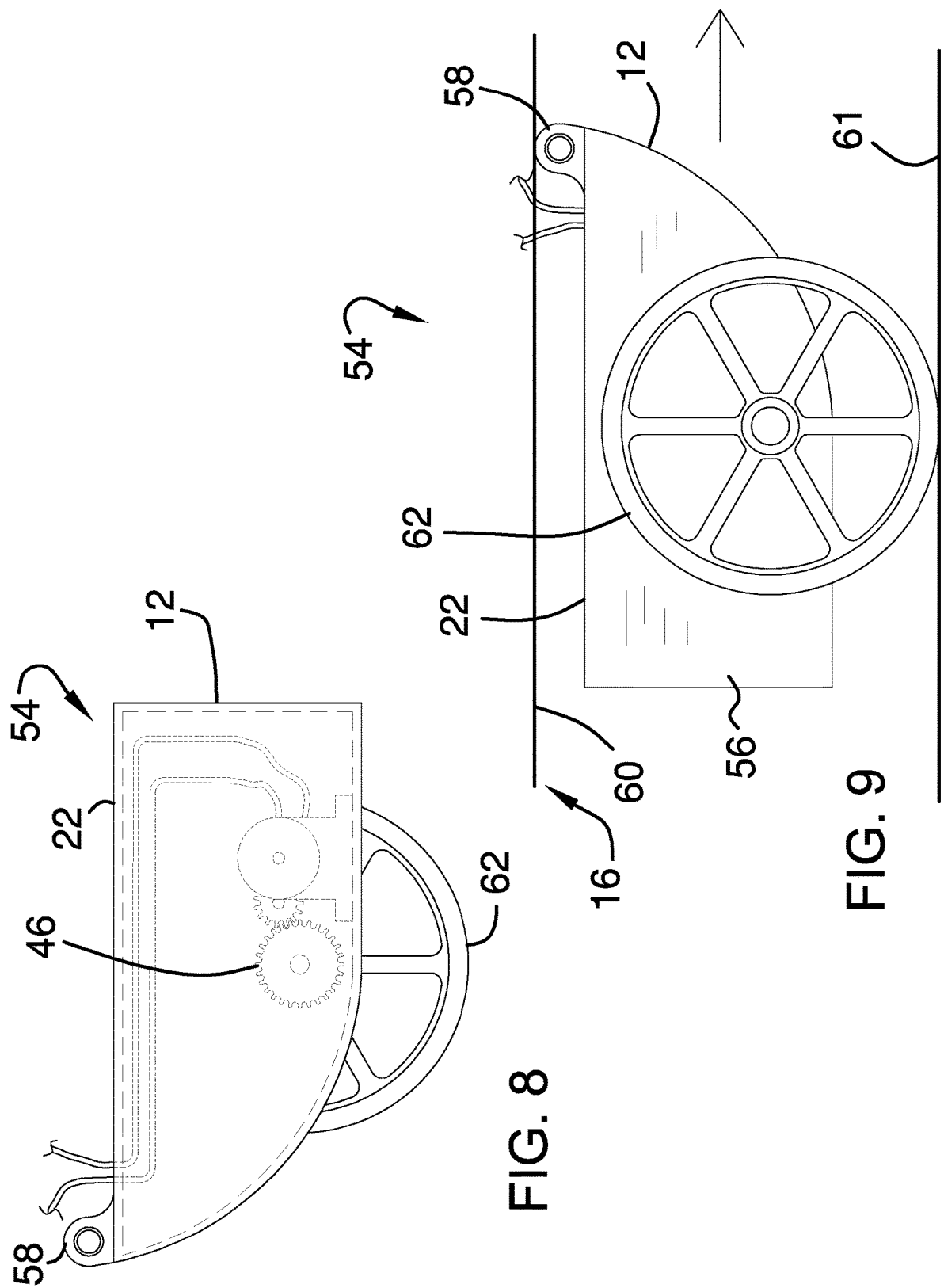

VEHICLE ROOF-MOUNTED WIND GENERATOR ASSEMBLY HAVING A CURVED FRONT HOUSING PORTION AND A HORIZONTAL-AXIS WIND TURBINE

CROSS-REFERENCE TO RELATED APPLICATIONS

Statement Regarding Federally Sponsored Research or Development

Not Applicable

The Names of the Parties to a Joint Research Agreement

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to generator devices and more particularly pertains to a new generator device for harnessing wind to charge batteries in electric vehicles or hybrid vehicles.

BRIEF SUMMARY OF THE INVENTION

An embodiment of the disclosure meets the needs presented above by generally comprising a housing that is mounted on a roof of a vehicle. The housing has a wind passage extending therethrough and wind passes through the wind passage when the vehicle is driven. A turbine is rotatably positioned in the housing. The turbine is positioned in the wind passage and the turbine is rotated by wind passing through the wind passage. A generator is mounted in the generator space and the generator is in mechanical communication with the turbine. Thus, the turbine rotates the generator when the turbine rotates thereby facilitating the generator to produce electrical current. The generator is electrically coupled to batteries in the vehicle to charge the batteries.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 8 is a left side phantom view of an alternative embodiment of the disclosure.

FIG. 9 is a right view of an alternative embodiment of the disclosure.

DETAILED DESCRIPTION OF THE INVENTION

Figure 1:
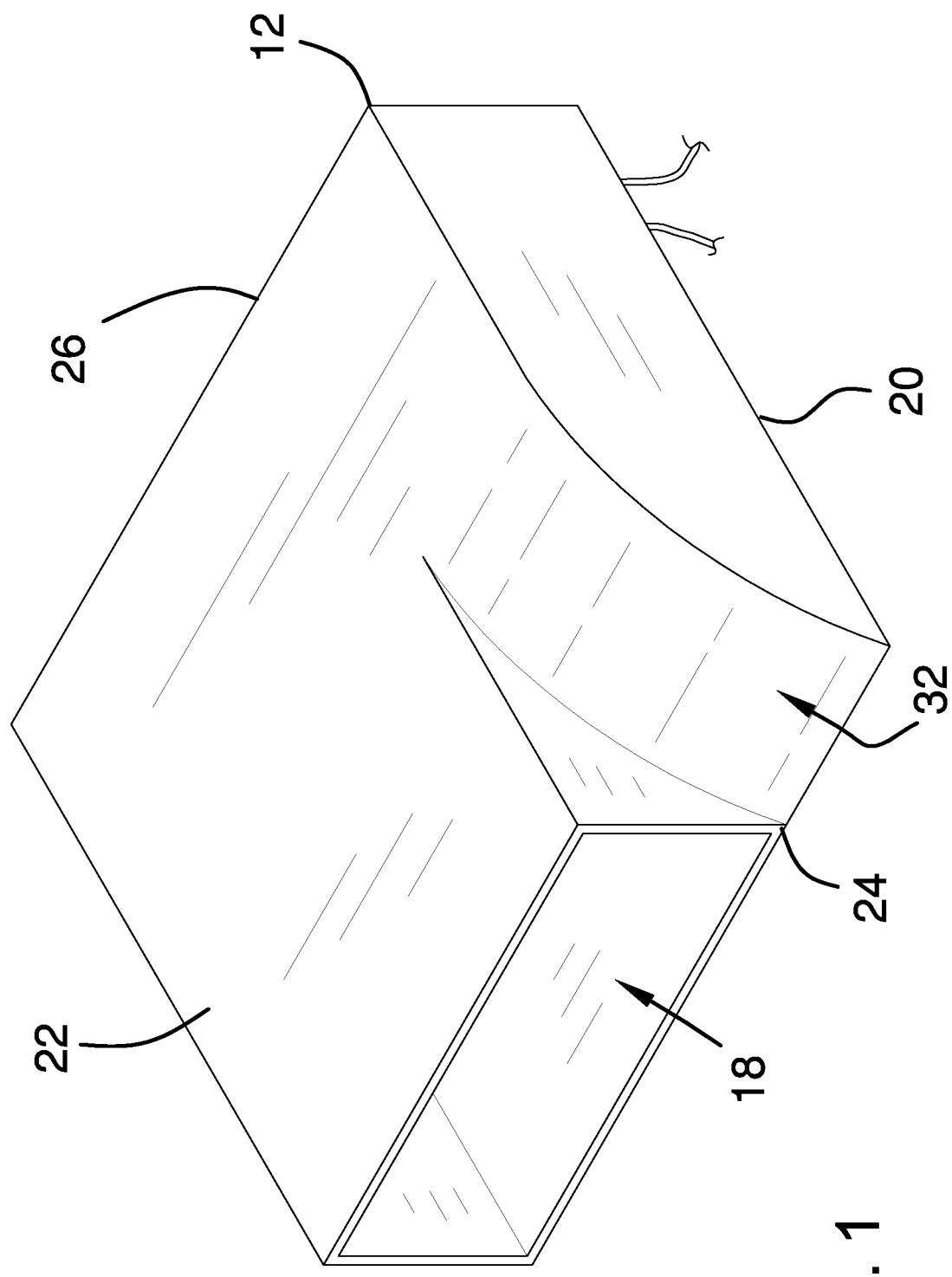
FIG. 1 is a front perspective view of a wind generator assembly according to an embodiment of the disclosure.
Figure 2:
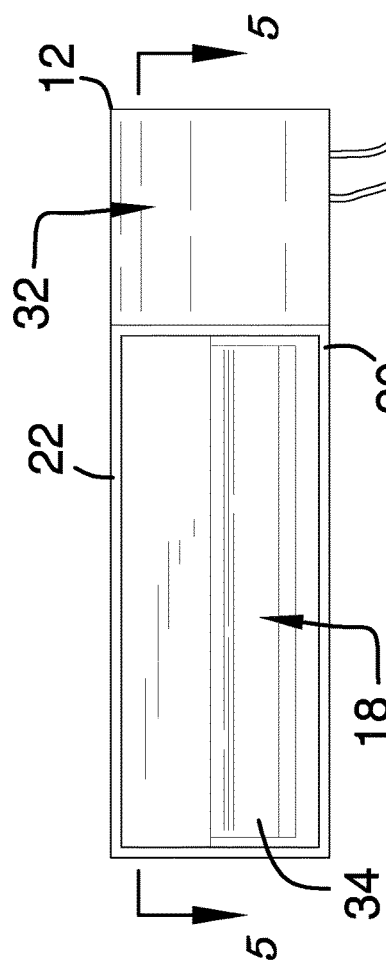
FIG. 2 is a front view of an embodiment of the disclosure.
Figure 3:
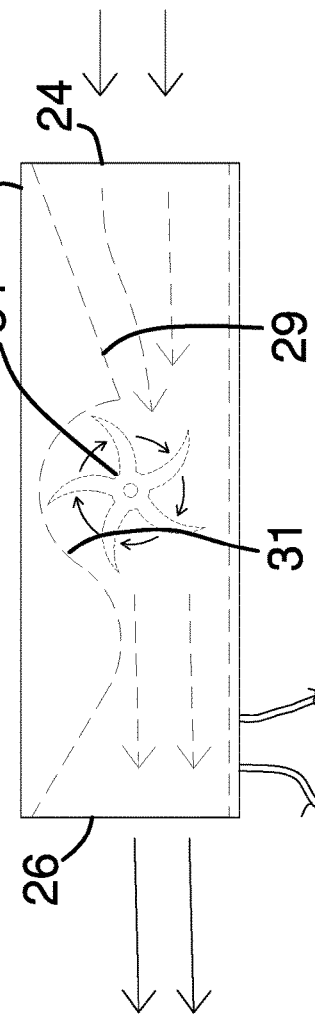
FIG. 3 is a right side phantom view of an embodiment of the disclosure.
Figure 4:
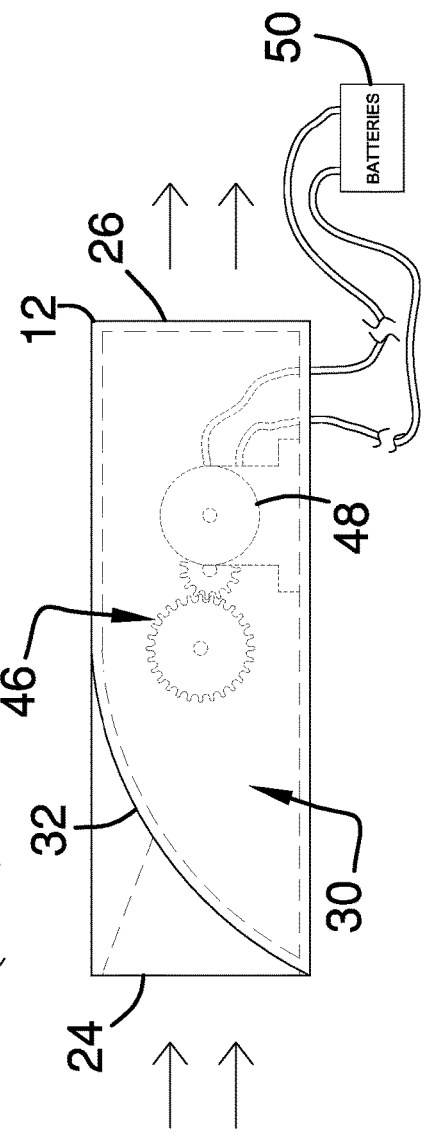
FIG. 4 is a left side phantom view of an embodiment of the disclosure.
Figure 5:
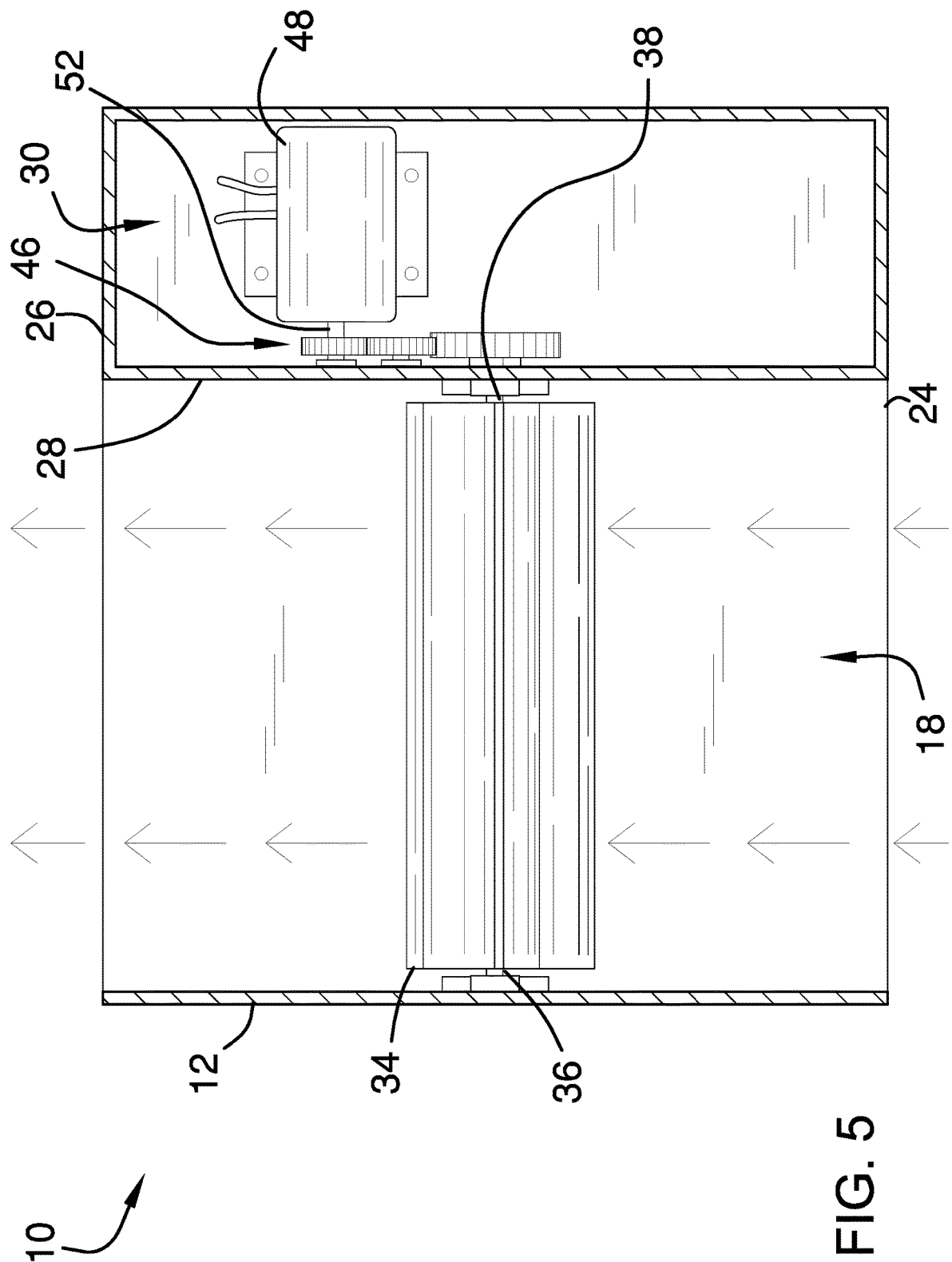
FIG. 5 is a cross sectional view taken along line 5-5 of FIG. 2 of an embodiment of the disclosure.
Figure 6:
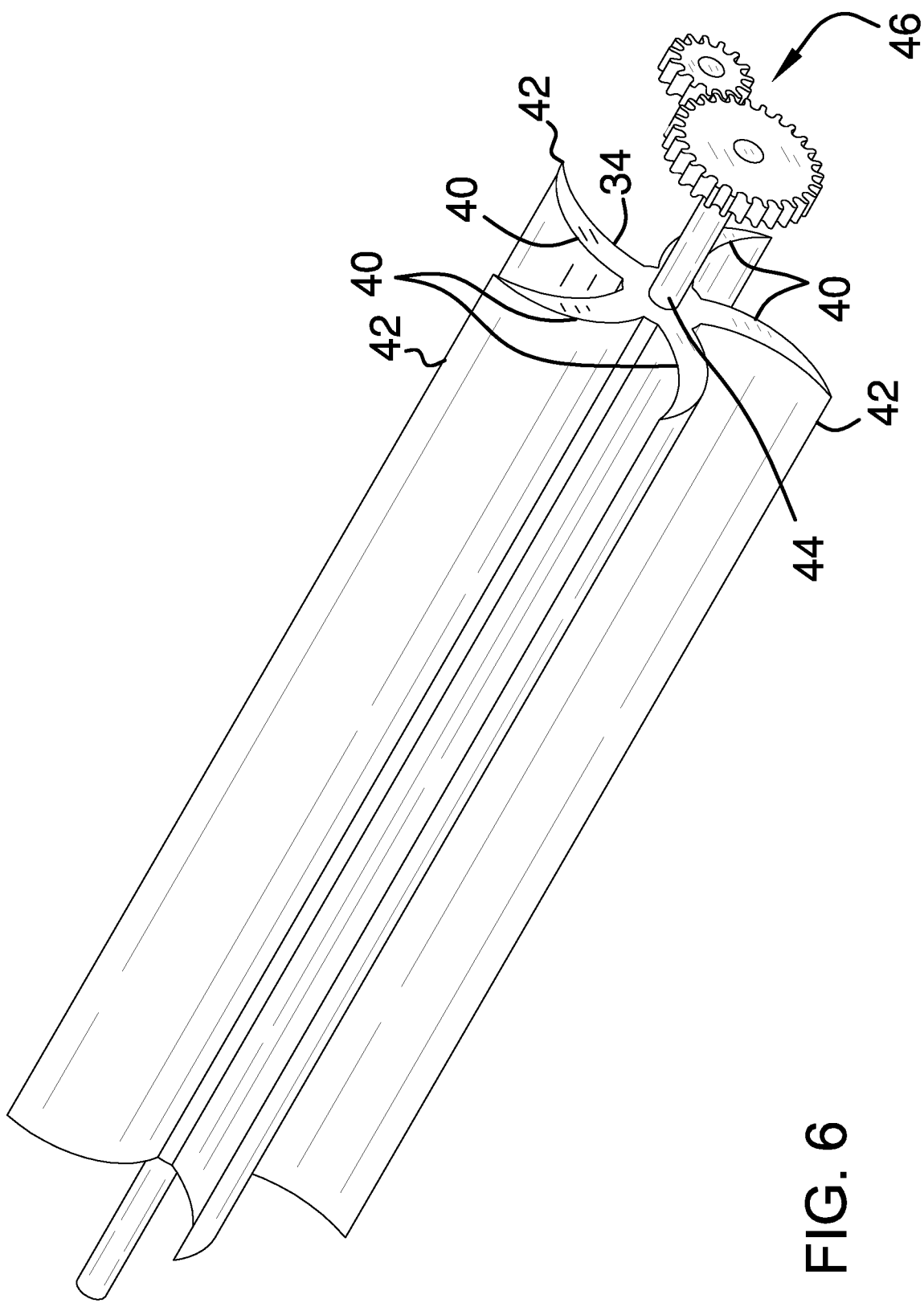
FIG. 6 is a perspective view of a turbine and drive gears of an embodiment of the disclosure.
Figure 7:
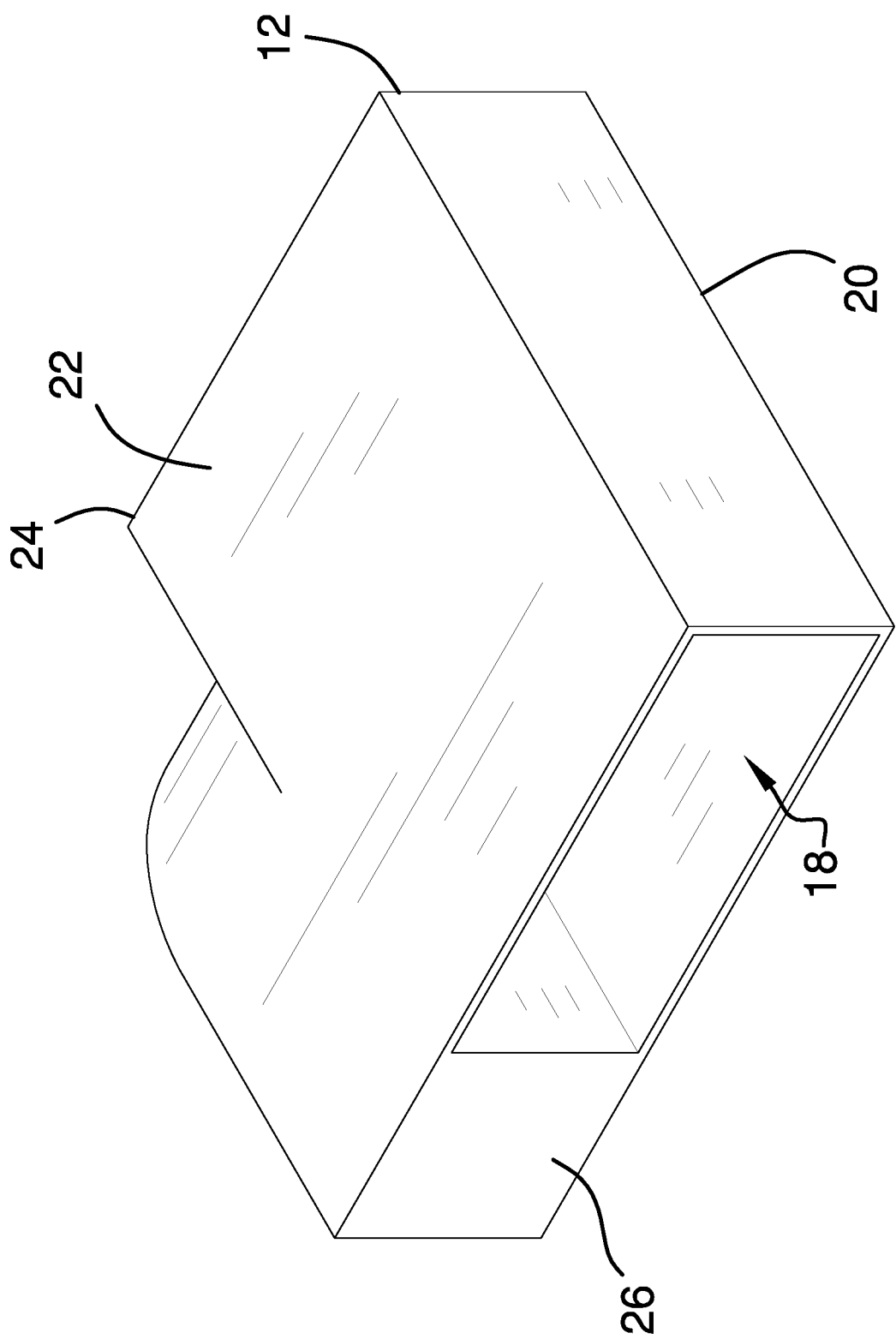
FIG. 7 is a back perspective view of an embodiment of the disclosure.
Figures 10, 11:
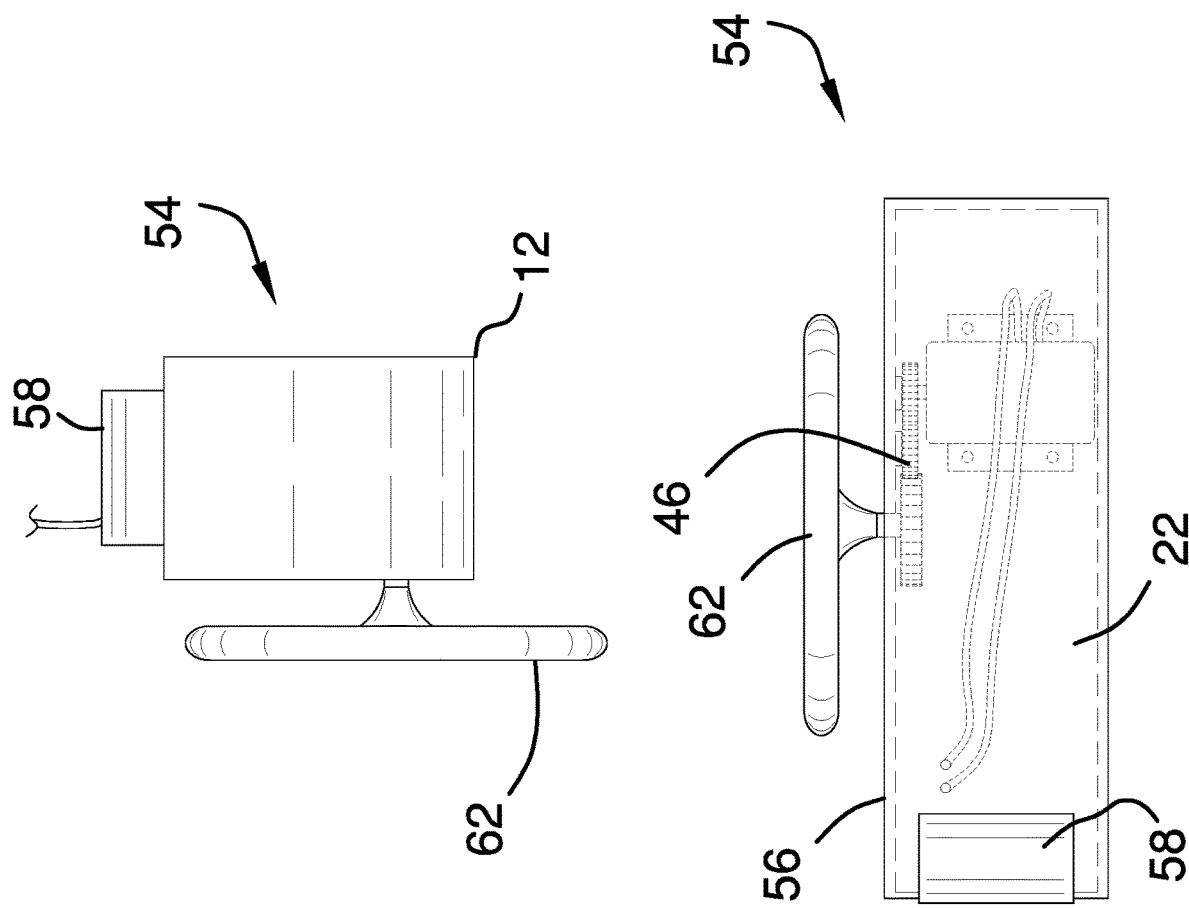
FIG. 10 is a front view of an embodiment of the disclosure.
FIG. 11 is a top phantom view of an alternative embodiment of the disclosure.
Figure 12:
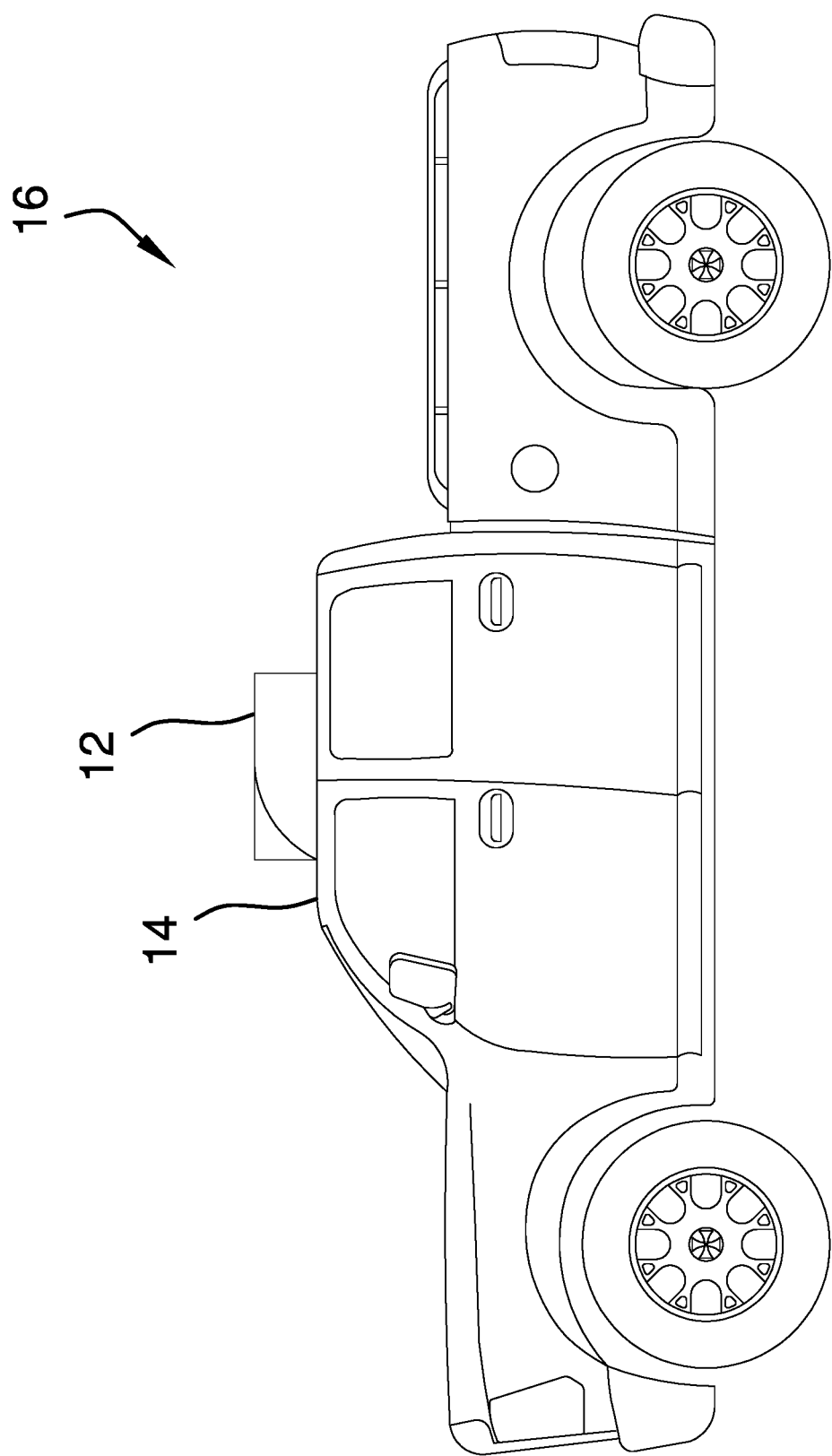
FIG. 12 is a perspective in-use view of an embodiment of the disclosure.

With reference now to the drawings, and in particular to FIGS. 1 through 12 thereof, a new generator device embodying the principles and concepts of an embodiment of the disclosure and generally designated by the reference numeral 10 will be described.

As best illustrated in FIGS. 1 through 12, the wind generator assembly 10 generally comprises a housing 12 that is mounted on a roof 14 of a vehicle 16. The housing 12 has a wind passage 18 extending therethrough, and wind passes through the wind passage 18 when the vehicle 16 is driven. The vehicle 16 may be an electric passenger vehicle or a hybrid passenger vehicle that is driven on public roadways. The housing 12 has a bottom wall 20, a top wall 22, a front wall 24 and a back wall 26, and the wind passage 18 extends through each of the front wall 24 and the back wall 26. A divider 28 is positioned within the housing 12 and the divider 28 extends between the front wall 24 and the back wall 26 to define a generator space 30 in the housing 12. The generator space 30 is positioned adjacent to the wind passage 18. The housing 12 may be a unitary structure of the vehicle 16 or the housing 12 may be retrofitted onto the vehicle 16.

The top wall 22 has a curved portion 32 curving downwardly toward the bottom wall 20. The curved portion 32 is aligned with the generator space 30. Moreover, the curved portion 32 is positioned on the front wall 24 to reduce drag with respect to air passing over the curved portion 32 when the vehicle 16 is driven. The bottom wall 20 is coupled to the roof 14 of the vehicle 16 having the front wall 24 being directed forwardly on the vehicle 16. The wind passage 18 has an upper bounding surface 29 and the upper bounding surface 29 may slope downwardly between each of the front wall 24 and the back wall 26 of the housing 12. Additionally, the upper bounding surface 29 may have a recess 31 that is centrally positioned in the wind passage 18.

A turbine 34 is rotatably positioned in the housing 12 and the turbine 34 is positioned in the wind passage 18. In this way the turbine 34 is rotated by wind passing through the wind passage 18. The turbine 34 has a first end 36 and a second end 38, and the turbine 34 is elongated between the first end 36 and the second end 38. Each of the first end 36 and the second end 38 is rotatably coupled to the housing 12 having the turbine 34 extending laterally across the wind passage 18.

The turbine 34 has a plurality of vanes 40 thereon and each of the vanes 40 has a distal end 42 with respect to a center line 44 of the turbine 34. Each of the vanes 40 is concavely arcuate between the center line 44 and the distal end 42 for capturing wind. The turbine 34 is oriented in the wind passage 18 such that each of the vanes 40 curves toward the front wall 24 of the housing 12 when the vanes 40 are directed downwardly during rotation of the turbine 34. Additionally, the turbine 34 may be positioned in the recess 31 in the upper bounding surface 29 of the wind passage 18.

A set of drive gears 46 is provided and each of the drive gears 46 is rotatably coupled to the divider 28. Each of the drive gears 46 is in mechanical communication with the turbine 34 such that the turbine 34 rotates the drive gears 46 when the turbine 34 is rotated. Each of the drive gears 46 is positioned in the generator space 30. Additionally, the set of drive gears 46 may multiply the rotational speed of the turbine 34.

A generator 48 is mounted in the generator space 30. The generator 48 is in mechanical communication with the turbine 34 such that the turbine 34 rotates the generator 48 when the turbine 34 rotates. In this way the generator 48 can produce electrical current. The generator 48 is electrically coupled to batteries 50 in the vehicle 16 to charge the batteries 50. The generator 48 has a drive shaft 52 and the drive shaft 52 is rotatably coupled to the drive gears 46 such that the drive gears 46 rotate the drive shaft 52 when the turbine 34 rotates. The generator 48 may be a electric generator similar to generators used in existing hybrid vehicles.

In an alternative embodiment 54 as shown in FIGS. 8 through 11, the housing 12 has a first lateral wall 56 and the top wall 22 of the housing 12 has a pivot point 58. The pivot point 58 is pivotally coupled to a bottom side 60 of the vehicle 16. In this way the housing 12 is spaced from a road 61 upon which the vehicle 16 is driving. A wheel 62 is rotatably coupled to the first lateral wall 56 of the housing 12 such that the wheel 62 rolls along the road 61. The pivot point 58 facilitates the wheel 62 to travel over uneven surfaces when the vehicle 16 is moving. The wheel 62 includes an axle 64 extending through the first lateral wall 56 of the housing 12. The axle 64 engages the drive gears 46 such that the wheel 62 rotates the drive gears 46 when the wheel 62 is rotated for charging the batteries 50 of the vehicle 16.

In use, the turbine 34 is rotated by wind when the vehicle 16 is driven. In this way the generator 48 is turned to produce electrical current with wind energy. The generator 48 charges the batteries 50 in the vehicle 16 when the vehicle 16 is driven. In this way the generator 48 enhances the range of electric vehicles or hybrid vehicles. Additionally, the generator 48 is in electrical communication with battery charging circuitry in the vehicle 16 for controlling the output of the generator 48.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A wind generator assembly being configured to be mounted to a roof of an electric or hybrid vehicle thereby producing electricity for charging batteries in the electric or hybrid vehicle, said assembly comprising:

a housing being mounted on the roof of the vehicle, said housing having a wind passage extending therethrough wherein said wind passage is configured to have wind pass therethrough when the vehicle is driven, wherein said housing has a bottom wall, a top wall, a front wall and a back wall, said wind passage extending through each of said front wall and said back wall, said wind passage having an intake end being perpendicular to a planar portion of said top wall and perpendicular to said bottom wall, said housing having a divider being positioned therein, said divider extending between said front wall and said back wall to define a generator space in said housing, said generator space being positioned adjacent to said wind passage, said bottom wall being coupled to the roof of the vehicle, said front wall being directed forwardly on the vehicle, wherein said top wall has a curved portion laterally positioned relative to said intake end of said wind passage, said curved portion curving downwardly toward said bottom wall, said curved portion being aligned with said generator space, said curved portion being positioned on said front wall, wherein said curved portion is configured to reduce drag with respect to air passing over said curved portion when the vehicle is driven;

a turbine being rotatably positioned in said housing, said turbine being positioned in said wind, passage wherein said turbine is configured to be rotated by the wind passing through said wind passage, wherein said turbine has a first end and a second end, said turbine being elongated between said first end and said second end, each of said first end and said second end being rotatably coupled to said housing, said turbine extending laterally across said wind passage in a direction parallel to the roof of the vehicle; and a generator being mounted in said generator space in said housing, said generator being in mechanical communication with said turbine such that said turbine rotates said generator when said turbine rotates thereby facilitating said generator to produce electrical current, said generator being electrically coupled to the batteries in the vehicle, wherein said generator is configured to charge the batteries.

2. The assembly according to claim 1, wherein said turbine has a plurality of vanes thereon, each of said vanes having a distal end with respect to a center line of said turbine, each of said vanes being concavely arcuate between said center line and said distal end wherein each of said vanes is configured to capture wind, said turbine being oriented in said wind passage such that each of said vanes curves toward said front wall of said housing when said vanes are directed downwardly during rotation of said turbine.

3. The assembly according to claim 1, further comprising a set of drive gears, each of said drive gears being rotatably coupled to said divider, each of said drive gears being in mechanical communication with said turbine such that said turbine rotates said drive gears when said turbine is rotated, each of said drive gears being positioned in said generator space.

4. The assembly according to claim 3, wherein said generator has a drive shaft, said drive shaft being rotatably coupled to said drive gears such that said drive gears rotate said drive shaft when said turbine rotates.

5. A wind generator assembly being configured to be mounted to a roof of an electric or hybrid vehicle thereby producing electricity for charging batteries in the electric or hybrid vehicle, said assembly comprising:

a housing being mounted on the roof of the vehicle, said housing having a wind passage extending therethrough wherein said wind passage is configured to have wind pass therethrough when the vehicle is driven, said housing having a bottom wall, a top wall, a front wall and a back wall, said wind passage extending through each of said front wall and said back wall, said wind passage having an intake end being perpendicular to a planar portion of said top wall and perpendicular to said bottom wall, said housing having a divider being positioned therein, said divider extending between said front wall and said back wall to define a generator space in said housing, said generator space being positioned adjacent to said wind passage, wherein said top wall has a curved portion laterally positioned relative to said intake end of said wind passage, said curved portion curving downwardly toward said bottom wall, said curved portion being aligned with said generator space, said curved portion being positioned on said front wall wherein said curved portion is configured to reduce drag with respect to air passing over said curved portion when the vehicle is driven, said bottom wall being coupled to the roof of the vehicle, said front wall being directed forwardly on the vehicle;

a turbine being rotatably positioned in said housing, said turbine being positioned in said wind passage wherein said turbine is configured to be rotated by the wind passing through said wind passage, said turbine having a first end and a second end, said turbine being elongated between said first end and said second end, each of said first end and said second end being rotatably coupled to said housing, said turbine extending laterally across said wind passage in a direction parallel to the roof of the vehicle, said turbine having a plurality of vanes thereon, each of said vanes having a distal end with respect to a center line of said turbine, each of said vanes being concavely arcuate between said center line and said distal end wherein each of said vanes is configured to capture wind, said turbine being oriented in said wind passage such that each of said vanes curves toward said front wall of said housing when said vanes are directed downwardly during rotation of said turbine;

a set of drive gears, each of said drive gears being rotatably coupled to said divider, each of said drive gears being in mechanical communication with said turbine such that said turbine rotates said drive gears when said turbine is rotated, each of said drive gears being positioned in said generator space; and a generator being mounted in said generator space, said generator being in mechanical communication with said turbine such that said turbine rotates said generator when said turbine rotates thereby facilitating said generator to produce electrical current, said generator being electrically coupled to the batteries in the vehicle, wherein said generator is configured to charge the batteries, said generator having a drive shaft, said drive shaft being rotatably coupled to said drive gears such that said drive gears rotate said drive shaft when said turbine rotates.

6. A wind generator system comprising:

a vehicle having a roof, said vehicle including batteries;

a housing being mounted on said roof of said vehicle, said housing having a wind passage extending therethrough wherein said wind passage is configured to have wind pass therethrough when said vehicle is driven, said housing having a bottom wall, a top wall, a front wall and a back wall, said wind passage extending through each of said front wall and said back wall, said wind passage having an intake end being perpendicular to a planar portion of said top wall and perpendicular to said bottom wall, said housing having a divider being positioned therein, said divider extending between said front wall and said back wall to define a generator space in said housing, said generator space being positioned adjacent to said wind passage, wherein said top wall has a curved portion laterally positioned relative to said intake end of said wind passage, said curved portion curving downwardly toward said bottom wall, said curved portion being aligned with said generator space, said curved portion being positioned on said front wall, wherein said curved portion is configured to reduce drag with respect to air passing over said curved portion when said vehicle is driven, said bottom wall being coupled to said roof of said vehicle, said front wall being directed forwardly on said vehicle;

a turbine being rotatably positioned in said housing, said turbine being positioned in said wind, passage wherein said turbine is configured to be rotated by the wind passing through said wind passage, said turbine having a first end and a second end, said turbine being elongated between said first end and said second end, each of said first end and said second end being rotatably coupled to said housing, said turbine extending laterally across said wind passage in a direction parallel to the roof of the vehicle, said turbine having a plurality of vanes thereon, each of said vanes having a distal end with respect to a center line of said turbine, each of said vanes being concavely arcuate between said center line and said distal end wherein each of said vanes is configured to capture wind, said turbine being oriented in said wind passage such that each of said vanes curves toward said front wall of said housing when said vanes are directed downwardly during rotation of said turbine;

a set of drive gears, each of said drive gears being rotatably coupled to said divider, each of said drive gears being in mechanical communication with said turbine such that said turbine rotates said drive gears when said turbine is rotated, each of said drive gears being positioned in said generator space; and a generator being mounted in said generator space, said generator being in mechanical communication with said turbine such that said turbine rotates said generator when said turbine rotates thereby facilitating said generator to produce electrical current, said generator being electrically coupled to the batteries in said vehicle wherein said generator is configured to charge the batteries, said generator having a drive shaft, said drive shaft being rotatably coupled to said drive gears such that said drive gears rotate said drive shaft when said turbine rotates.

* * * * *